(12) United States Patent
Urian

(10) Patent No.: US 10,630,475 B2
(45) Date of Patent: Apr. 21, 2020

(54) METHOD FOR A PSEUDONYMOUS KEY-AGREEMENT BETWEEN A PORTABLE DATA CARRIER AND A TERMINAL

(71) Applicant: GIESECKE & DEVRIENT GMBH, München (DE)

(72) Inventor: Rainer Urian, Augsburg (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 162 days.

(21) Appl. No.: 15/537,597

(22) PCT Filed: Dec. 15, 2015

(86) PCT No.: PCT/EP2015/002583
§ 371 (c)(1),
(2) Date: Jun. 19, 2017

(87) PCT Pub. No.: WO2016/096148
PCT Pub. Date: Jun. 23, 2016

(65) Prior Publication Data
US 2018/0270061 A1     Sep. 20, 2018

(30) Foreign Application Priority Data
Dec. 18, 2014  (DE) ........................ 10 2014 019 067

(51) Int. Cl.
*H04L 9/30* (2006.01)
*H04L 9/08* (2006.01)

(52) U.S. Cl.
CPC .......... *H04L 9/3013* (2013.01); *H04L 9/0841* (2013.01); *H04L 2209/42* (2013.01)

(58) Field of Classification Search
CPC combination set(s) only.
See application file for complete search history.

(56) References Cited

U.S. PATENT DOCUMENTS 8,978,118 B2 *  3/2015  Aichroth ................ H04L 9/006
                                                705/1.1
9,275,241 B2    3/2016  Meister
(Continued)

FOREIGN PATENT DOCUMENTS

WO    2012084241 A1    6/2012
WO    2012119790 A1    9/2012
(Continued)

OTHER PUBLICATIONS

Miros Aw Kuty Owski et al: "Restricted Identification Scheme and Diffie-Hellman Linking Problem," Nov. 27, 2011 (Nov. 27, 2011), Trusted Systems, Springier Berlin Heidelberg, Berlin, Heidelberg, pp. (221-238).*

(Continued)

*Primary Examiner* — Khoi V Le
(74) *Attorney, Agent, or Firm* — Workman Nydegger

(57) ABSTRACT

A pseudonymous Diffie-Hellman protocol is provided by means of a combination of the CA protocol with the RI protocol. According to the invention the determining of the pseudonym from the RI protocol and the forming of the secure communication channel from the CA protocol occur substantially in parallel. According to the invention there is likewise employed a group key for the CA part of the protocol according to the invention. Due to the configuration of the protocol according to the invention it is not possible, in contrast to the known protocols, for an attacker who should succeed in establishing the group key of a portable data carrier according to the invention, to generate the pseudonym of another user.

15 Claims, 3 Drawing Sheets

(56) References Cited

U.S. PATENT DOCUMENTS

| | | | | |
|---|---|---|---|---|
| 2006/0062384 A1* | 3/2006 | Dondeti | ................. | H04L 9/065 |
| | | | | 380/44 |
| 2010/0325441 A1* | 12/2010 | Laurie | .................... | G06F 21/31 |
| | | | | 713/185 |
| 2013/0326235 A1* | 12/2013 | Meister | ................ | H04L 9/0841 |
| | | | | 713/189 |
| 2014/0157385 A1 | 6/2014 | Kuegler et al. | | |
| 2015/0271668 A1* | 9/2015 | Sun | ...................... | H04W 12/04 |
| | | | | 455/411 |

FOREIGN PATENT DOCUMENTS

| | | | | | |
|---|---|---|---|---|---|
| WO | 2013007686 A1 | | 1/2013 | | |
| WO | WO2013007686 | * | 1/2013 | .............. | H04L 9/32 |
| WO | 2014037075 A1 | | 3/2014 | | |

OTHER PUBLICATIONS

"BSI TR-03110 Technical Guideline Advanced Security Mechanisms for Machine Readable Travel Documents and eIDAS Token," German Federal Office for Information Security, URL: https://www.bsi.bund.de/EN/Publications/ TechnicalGuidelines/TR03110/BSITR03110.html, pp. 1-3, downloaded on Jun. 17, 2017.
German Search Report for corresponding German Application No. 102014019067.6, dated Sep. 11, 2015.
International Search Report for corresponding International PCT Application No. PCT/EP2015/002583, dated Mar. 31, 2016.
Kutylowski et al., "Restricted Identification Scheme and Diffie-Hellman Linking Problem," Trusted Systems, Nov. 27, 2011, pp. 221-238, Springer Berlin Heidelberg, Berlin, Heidelberg.

* cited by examiner

METHOD FOR A PSEUDONYMOUS KEY-AGREEMENT BETWEEN A PORTABLE DATA CARRIER AND A TERMINAL

BACKGROUND

The invention relates to methods for pseudonymously agreeing on a key between a stationary and/or a portable data carrier, preferably in the form of a security document, and a terminal. Further, the invention concerns a correspondingly configured portable data carrier as well as a correspondingly configured terminal.

Portable data carriers are often employed as security documents, for example in the form of a national identity card, a passport, a signature card or the like. Modern security documents now as a rule have a memory as well as a processor and are arranged for executing security applications. Examples of use for such security applications are an authenticating vis-à-vis a terminal, the establishing of a secure data communication channel, the electronic signing of data, and the verifying of signatures and the like. In this manner, such data carriers can be used for interacting with arbitrary service providers, in order for example to authenticate themselves for electronic transactions, e.g. over the Internet, and to carry these out in a secure manner. Further, the security documents can be used for storing data, such as personal and/or security-relevant data as well as other useful data, and support access control systems for example.

Frequently, portable data carriers configured as a security document have a suitable communication interface, for example, an RF or NFC communication interface to be able to communicate contactlessly with a terminal.

Such a portable data carrier configured as a security document is the new German identity card (nPA) or electronic national identity card, in which among other things the protocol "Chip Authentication" (CA) is used. This protocol serves to set up a secure connection between a portable data carrier and a terminal and to be able to recognize a "cloned" data carrier. The CA protocol provides that in every portable data carrier an individual key pair is deposited which consists of a private one and a public key. For data protection reasons, e.g. to make the tracking of a portable data carrier impossible, the key of the portable data carrier as a rule is a group key, i.e. a key which is common to a group of portable data carriers.

For the CA protocol, the public key is sent to the terminal together with a random number. For each reading process, the terminal likewise generates a separate key pair consisting of a public and a private (secret) key, and sends its public key to the portable data carrier. Now the data carrier as well as the terminal respectively can compute the same secret key with their own private key, the public key of the communication partner and the random number. In the further communication between the portable data carrier and the terminal, this derived secret key secures the strong encryption of the data transferred between the data carrier and the terminal.

With the help of the derived secret key, the terminal can now check whether the portable data carrier possesses the "right" private key. A "cloned" portable data carrier cannot possess the original private key. If it would simply utilize another private key, the common secret would be wrong. If a new key pair had been generated for a "cloned" data carrier, this would stand out during the passive authentication because the public key is protected against unnoticed changes by a digital signature.

A further option which a portable data carrier offers in the form of an nPA is known to the skilled person under the term "Restricted Identification (RI)". The RI protocol between a portable data carrier and a terminal serves for generating pseudonyms which are specific to the chip of the portable data carrier and the terminal sector (e.g. all terminals of a service provider). It thereby becomes possible for a (authenticated) terminal to recognize the chip of a portable data carrier based on the previously obtained pseudonym without reading out personal data. Besides, the RI protocol is configured so that it is not possible to interlink the pseudonyms of different sectors.

For further details on the CA protocol and on the RI protocol, reference is made to the technical guideline "BSI TR-03110 Technical Guideline Advanced Security Mechanisms for Machine Readable Travel Documents" of the German Federal Office for Information Security (see https://www.bsi.bund.de/EN/Publications/TechnicalGuidelines/TR03110/B SITR03110.html).

In the technical guideline mentioned hereinabove, it is described how the RI protocol can be employed for the purpose of revoking lost or stolen portable data carriers. However, the embodiment of the known RI protocol does not allow revoking an individual portable data carrier if its CA protocol key has been compromised. In this case the secure CA channel can no longer guarantee the correct computation of the pseudonym on the basis of an RI key of the portable data carrier. If an attacker has control over the secure CA channel, he can readily choose an arbitrary pseudonym. He is thus not forced to compute this by means of a known secret key. Thus the attacker can pretend to be a certain, real portable data carrier, by employing its pseudonym. Consequently, in case that the CA protocol key of a portable data carrier has been compromised, all portable data carriers which belong to the group of the compromised data carrier, i.e. employ the same group key as a key for the CA protocol, must be revoked, which is evidently hardly user-friendly.

SUMMARY

The object of the present invention is to remedy the hereinabove disadvantage.

The basic idea of the present invention is in supplying a pseudonym Diffie-Hellman protocol (PDH protocol) by means of a combination of the CA protocol with the RI protocol. According to the invention, determining the pseudonym from the RI protocol and configuring the secure communication channel from the CA protocol occur substantially in parallel. According to the invention, a group key is likewise employed for the CA part of the protocol according to the invention. Due to the configuration of the protocol according to the invention it is not possible, in contrast to the known protocols, for an attacker who should succeed in establishing the group key of a portable data carrier according to the invention, to generate the pseudonym of another user.

Based on this fundamental idea, according to a first aspect of the invention a method for pseudonymously agreeing on a key Z between a stationary data carrier and/or a portable data carrier and a terminal is supplied, wherein on the terminal a base element J and the group elements G1 and G2 are present and on the portable data carrier a public key PKC and the secrets s and t are present, wherein u is the discrete logarithm of G2 to the base G1, i.e. G2=G1*u, and wherein the public key PKC is a discrete logarithmic representation formed from the two secrets s and t and the two group elements G1 and G2, i.e. PKC=G1*s+G2*t. Here the method on the portable data carrier comprises the following steps: receiving the base element J and a first derived base element H1 and a second derived base element H2 from the terminal, wherein by means of a first random number r1 and a second random number r2 the first derived base element H1 is derived from the base element J and the group element G1, and the second derived base element H2 is derived from the group element G2; computing a pseudonym K by means of the base element J transferred from the terminal and the secret s; sending the public key PKC and the pseudonym K to the terminal; and computing a common secret Z by means of the derived base elements H1 and H2 and the secrets s and t, wherein as a key between the portable data carrier and the terminal the common secret Z or a key derived therefrom are employed.

According to the invention, the data carrier can be a stationary data carrier and/or a portable data carrier. For reasons of the simplicity of the description, the term "portable data carrier" is employed hereinafter.

Preferably the common secret Z is computed by computing Z=H1*s+H2*t.

According to a second aspect of the invention, a method for pseudonymously agreeing on a key Z between a portable data carrier and a terminal is supplied, wherein on the terminal a base element J and the group elements G1 and G2 are present and on the portable data carrier a public key PKC and the secrets s and t are present, wherein u is the discrete logarithm of G2 to the base G1, i.e. G2=G1*u, and wherein the public key PKC is a discrete logarithmic representation formed from the two secrets s and t and the two group elements G1 and G2, i.e. PKC=G1*s+G2 *t. Here the method on the terminal comprises the following steps: generating the first random number r1 and the second random number r2; deriving a first derived base element H1 and a second derived base element H2, wherein by means of the first random number r1 and the second random number r2 the first derived base element H1 is derived from the base element J and the group element G1, and the second derived base element H2 is derived from the group element G2; sending the base element J, the first derived base element H1 and the second derived base element H2 to the portable data carrier; receiving the public key PKC and a pseudonym K of the portable data carrier, wherein the pseudonym K is formed from the base element J and the secret s; and computing a common secret Z by means of the public key PKC, the first random number r1, the pseudonym K and the second random number r2, wherein as a key between the portable data carrier and the terminal the common secret Z or a key derived therefrom is employed.

Preferably the common secret Z is computed by computing Z=(PKC*r1+K)*r2.

According to preferred embodiments of the invention, a positive list having the pseudonyms with regard to the base element J of all authentic, hitherto not-revoked portable data carrier is deposited on the terminal.

The hereinafter preferred embodiments can be implemented advantageously within the scope of the method according to the first aspect of the invention as well as within the scope of the method according to the second aspect of the invention.

According to the preferred embodiment of the invention, the first derived base element H1 is derived by computing H1=(G1*r1+J)*r2, and the second derived base element H2 is derived by computing H2=G2*r1*r2.

Preferably the pseudonym K is computed by computing K=J*s.

According to preferred embodiments of the invention, an obfuscated pseudonym K' is computed by the portable data carrier and sent to the terminal. Preferably for the obfuscated pseudonym there holds that K'=K*r3, wherein r3 is a random number.

According to a third aspect of the invention, a portable data carrier is supplied which is configured for carrying out a method according to the first aspect of the invention. Preferably, the portable data carrier is a security document.

According to a fourth aspect of the invention, a terminal is supplied which is configured for carrying out a method according to the second aspect of the invention.

BRIEF DESCRIPTION OF THE DRAWINGS

Further features, advantages and objects of the invention will emerge from the following detailed description of several embodiment examples and embodiment alternatives. Reference is made to the drawings, in which there are shown.

DETAILED DESCRIPTION OF VARIOUS EMBODIMENTS

Figure 1:
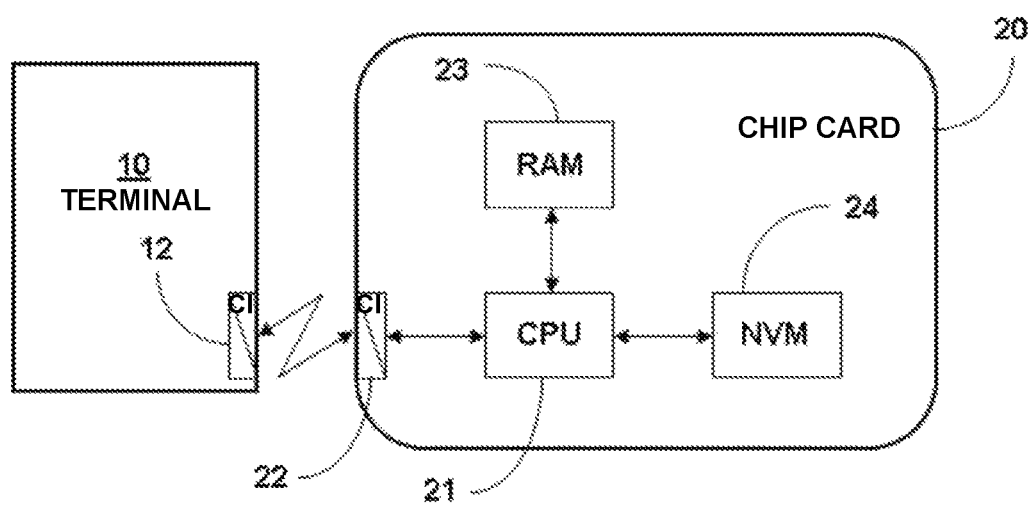
FIG. 1 a schematic representation of a portable data carrier according to the invention in communication with a terminal according to the invention, FIG. 2 a course of the communication between the portable data carrier and the terminal of FIG. 1 according to a first preferred embodiment of the invention, and FIG. 3 a course of the communication between the portable data carrier and the terminal of FIG. 1 according to a second preferred embodiment of the invention.

FIG. 1 shows a schematic representation of a preferred embodiment of a portable data carrier 20 according to the invention in the form of a chip card in communication with an external entity in the form of a terminal 10 according to the invention. Preferably, the portable data carrier 20 is a security document such as a national identity card, a passport, a signature card and the like.

The portable data carrier 20 in the form of a chip card as represented in FIG. 1 is configured for exchanging data with the terminal 10. An exchange of data is understood here to be a signal transmission, a mutual control and in simple cases also a connection between the terminal 10 and the chip card 20. In information theory a data exchange is characterized in particular by the transmitter-receiver model: Data or information items are encoded into symbols and then transmitted from a transmitter to a receiver via a transmission channel. It is decisive here that transmitter and receiver employ the same coding in order that the receiver can decode the data.

For communicating between the chip card 20 and the terminal 10, both the chip card 20 and the terminal 10 have suitable communication interfaces (CI) 22 and 12. The interfaces 22 and 12 can be for example so configured that the communication therebetween or between the chip card 20 and the terminal 10 is effected contactlessly, i.e. via the over-the-air interface, as indicated in FIG. 1 by the jagged arrow, for example via an RF or NFC interface. Alternatively, the chip card 20 can be connected to the interface 12 of the terminal 10 via the interface 22 galvanically, i.e. using physical contacts. In this case, the interface 22 is formed as a rule as a contact pad arranged on one side of the chip card 20, with contact areas for data exchange with the terminal 10. The present invention of course also comprises portable data carriers in the form of chip cards having both an interface for contact-type communication with a terminal and an interface for contactless communication with a terminal, and which are known to the skilled person as dual-interface chip cards.

Besides the interface 22 for communication with the terminal 10, the chip card 20 comprises a central processing or computing unit (CPU; also called a processor) 21, which is in communication connection with the interface 22. As is known, the primary objects of the processer 21 are executing arithmetic and logic functions, and reading and writing data elements, as is defined by a software application running on the processor 21. The processor 21 is further connected to a volatile working memory (RAM) 23 and a non-volatile re-writable memory 24 (designated as "NVM" (non-volatile memory) in FIG. 1). Preferably the non-volatile memory 24 is a flash memory (flash EEPROM). It may be for example a flash memory with a NAND or a NOR architecture. Besides a re-writable part, the non-volatile memory 24 can further have a ROM.

In the preferred embodiment represented in FIG. 1, there is stored in the non-volatile memory 24 of the chip card 20 program code which can be executed by the processor 21. In particular program code can be implemented in the non-volatile memory 24 of the chip card 20 by which the chip card 20 is configured to carry out the communication protocols according to the invention with the terminal 10 as described in conjunction with the FIGS. 2 and 3.

As already mentioned hereinabove, the invention is based on the known CA protocol and the known RI protocol and combines these two protocols in a common protocol advantageously. The steps S1a and S1b of FIG. 2 show which data elements are present at the beginning of the protocol according to the invention on the portable data carrier 20, preferably configured as a chip card, or on the terminal 10, namely the public key PKC and the two secrets s and t on the portable data carrier 20 and the base element known from the RI protocol J on the terminal 10.

As with the CA protocol, the public key PKC of the portable data carrier 20 is preferably a group key, i.e. holds for a group of portable data carriers 20. According to the invention, the public key PKC of the portable data carrier 20 is a discrete logarithmic representation (DLREP) formed from the two secrets s and t and two group elements G1 and G2, i.e. PKC=G1*s+G2*t.

Figure 2:
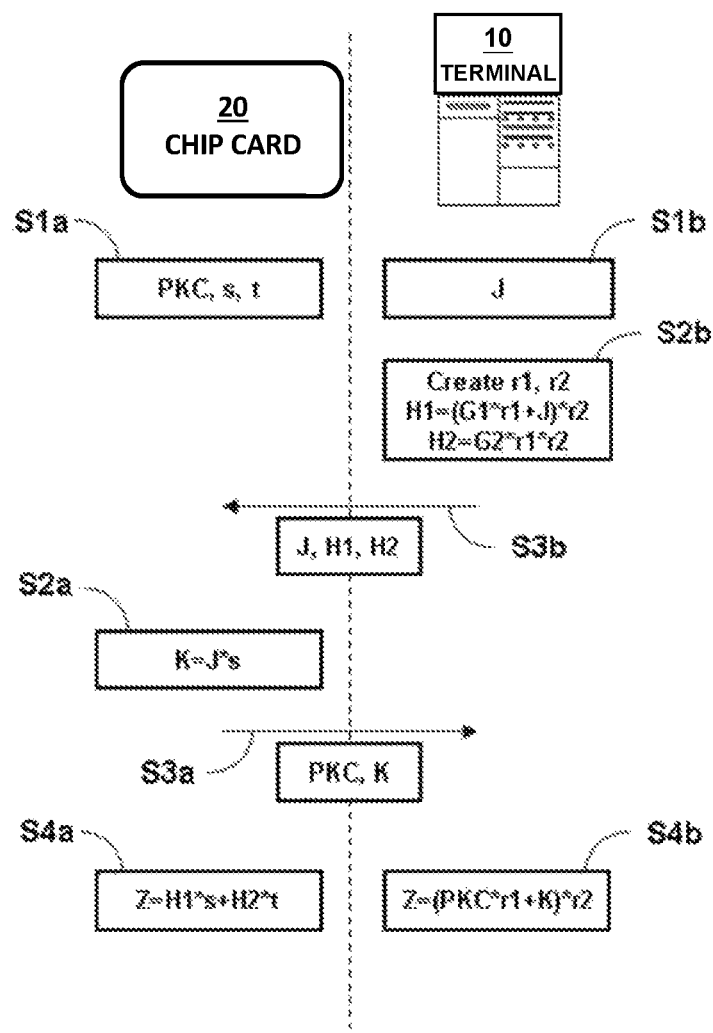
Figure 3:
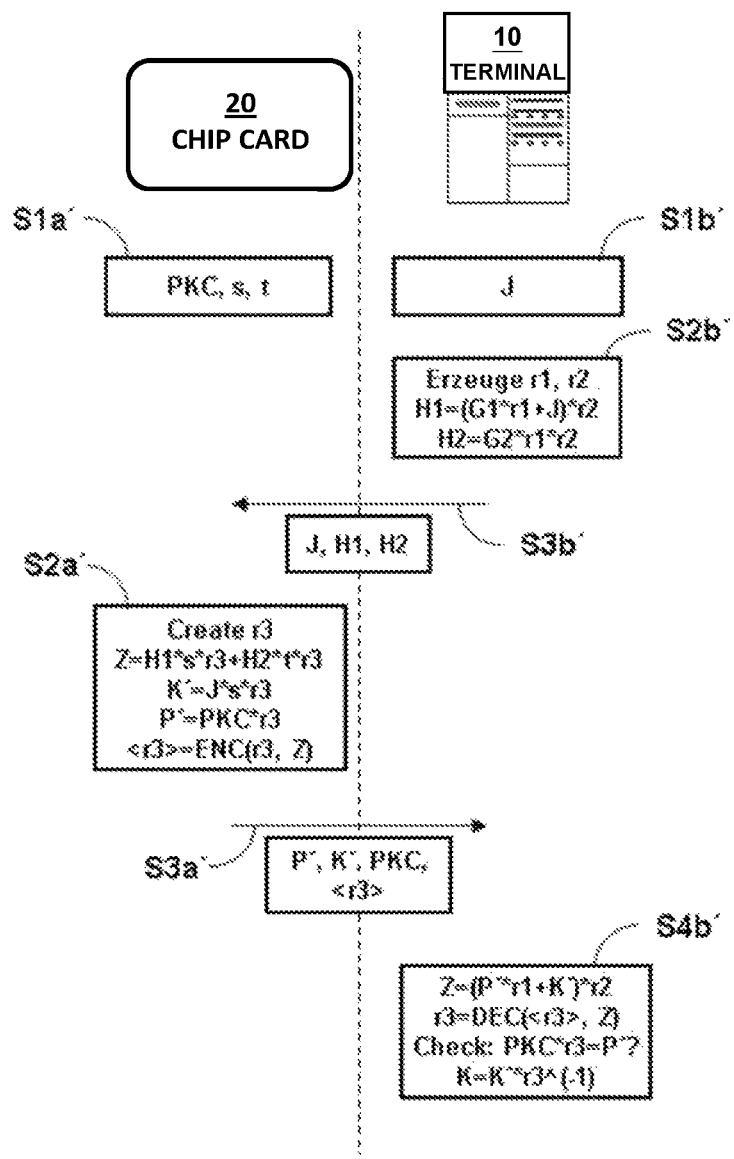

As the skilled person will recognize, the preferred embodiments of the invention described in the FIGS. 2 and 3 are variants of the Diffie-Hellman protocol (DH protocol) while employing cryptography by means of elliptical curves (ECC; "Elliptic Curve Cryptography"). The implementation of the DH protocol by means of elliptical curves is also designated "Elliptic Curve Diffie-Hellman (ECDH)". As the skilled person knows, for the cryptography by means of elliptical curves, the addition "+" of points of an elliptical curve and the multiplication "*" with numbers are defined. Points of an elliptical curve, which can be designated here as certain points of an elliptical curve also as base or groups element or base, such as the public PKC or the base element J, are marked as uppercase letters in the present description and in the figures, while numbers, such as the secrets s and t, are marked by lowercase letters. For further details on the cryptography by means of elliptical curves, reference by way of example is made to the book "Elliptic Curve Public Key Cryptosystems", A. Menezes, Kluwer Academic Publishers, 1993.

When supplying the public key PKC of the portable data carrier 20 in step S1a of FIG. 2, it should be ensured that only the manufacturer or issuer of the portable data carrier 20 knows the discrete logarithm of G2 to the base G1, e.g. G2=G1*u. This means that merely the manufacturer or the issuer of the portable data carrier 20 can compute such a representation. To determine the discrete logarithmic representation, the manufacturer or issuer of the portable data carrier 20 can for example carry out the following steps: First he generates a random number x and with it computes the group key PKC=G1*x. Thereupon he generates a random number t and computes s=x−t*u. As secret or private key for the part of the method according to the invention which is inspired by the RI protocol, for example s or t of this representation can be chosen.

For the hereinafter described preferred embodiment of the invention, s is chosen as the secret RI key. The hereinafter described protocol according to the invention for the Diffie-Hellman key agreement carries out the following proof: a proof of knowledge of a discrete logarithmic representation PKC=G1*s+G2*t as well as proof that there holds for the RI pseudonym K:K=J*s.

As already mentioned hereinabove in connection with step S1a of FIG. 2, the portable data carrier 20 has the public key PKC ("public key card") and the secret keys s and t, which are related to each other through the following discrete logarithmic representation: PKC=G1*s+G2*t. As likewise already described hereinabove, the group elements G1 and G2 can have been securely deposited on the portable data carrier 20, for example by the manufacturer during the manufacture or by the issuer of said portable data carrier.

With further reference to FIG. 2, hereinafter are described the steps carried out according to a preferred embodiment of the invention for the communication between the portable data carrier 20 and the terminal 10. In a step S2b of FIG. 2, the terminal 10 generates two random numbers r1 and r2 and from these computes two derived group elements H1 and H2, wherein it holds that H1=(G1*r1+J)*r2 and H2=G2*r1*r2. In step S3b of FIG. 2, the terminal 10 sends its RI base element J as well as H1 and H2 to the portable data carrier 20.

In step S2a of FIG. 2, the portable data carrier 20 computes the RI pseudonym K with K=J*s. Thereupon, in step S3a of FIG. 2, the portable data carrier 20 sends the computed RI pseudonym K as well as its public key PKC to the terminal 10. The skilled person will however recognize that the public key PKC can also be transmitted to the terminal 10 already at an earlier time point, e.g. before the execution of the protocol described here.

In the steps S4a and S4b of FIG. 2, the portable data carrier 20 as well as the terminal 10 compute the common secret or the common key, namely Z=H1*s+H2*t= (PKC*r1+K)*r2=Z. By means of the thus agreed key, a secure communication channel can be formed between the portable data carrier 20 and the terminal 10.

According to a further preferred embodiment, the method just described can be improved as follows, namely for application cases for which it is considered unacceptable that the RI pseudonym K is transferred from the portable data carrier 20 to the terminal 10 in plain text and can therefore be in principle intercepted. In such a case, according to a preferred embodiment of the invention the pseudonym K is masked, preferably by multiplying it with a random number. The corresponding protocol according to the invention is explained hereinafter with reference to FIG. 3.

Because the steps S1a', S1b', S2b' and S3b' of FIG. 3 are identical to the corresponding steps of FIG. 2, reference can be made to the hereinabove description these steps.

In step S2a' of FIG. 3 the portable data carrier 20 generates a random number r3 and computes the common secret $Z=H1*s*r3+H2*t*r3$. The common secret Z can, however, also be computed at a later time point by the portable data carrier 20.

To obfuscate the pseudonym K, the portable data carrier 20 computes the obfuscated pseudonym K' with $K'=J*s*r3$. Further, the portable data carrier 20 computes the obfuscated public key of $P'=PKC*r$.

By means of the common secret Z or a key derived therefrom, the portable data carrier 20 encrypts the random number r3, i.e. $<r3>=ENC(r3, Z)$, wherein ENC(x, K) is a suitable encryption function of the data element x with the key K. In step S3a' of FIG. 3 the portable data carrier 20 sends P', K', PKC and the encrypted random number r3, i.e. <r3>, to the terminal 10.

In step S4b' of FIG. 3 the terminal 10 computes the common secret $Z=(P'*r1+K')*r2$ with the help of P' and K'. By means of the common secret Z or a key derived therefrom, the terminal 10 decrypts the encrypted random number <r3>, i.e. $r3=DEC(<r3>, Z)$, wherein DEC(x, K) is a suitable decryption function of the data element x with the key K (as a rule the decryption function DEC(x, K) is the inverse function of the encryption function ENC(x, K)). Then the terminal 10 checks whether there holds $P'=PKC*r3$, and, if this is the case, computes the pseudonym K according to $K=K'*r3^{-1}$.

The skilled person will recognize that for the preferred embodiment of FIG. 3, the portable data carrier 20 and the terminal 10 agree on a common secret Z, wherein the portable data carrier 20 transfers an obfuscated pseudonym K' to the terminal 10, from which the terminal 10 can compute the actual pseudonym $K=K'*r3^{-1}$. In the event an attacker should succeed in obtaining the private key of a portable data carrier which belongs to the group to which the portable data carrier 20 also belongs, it is not possible for the attacker to deduce the pseudonym of the portable data carrier 10. If the attacker should, however, succeed in getting the private keys of two portable data carriers of a group, then the attacker is able to compute the discrete logarithm of G2 to the base G1 as follows: From $PKC=G1*s+G2*t=G1*s'+G2*t'$ it follows that $G2=G1*(s-s)*(t-t')^{-1}$, whereof in turn it follows that $u=G2/G1=(s-s)*(t-t')^{-1}$. With the thus computed u, the attacker can compute arbitrary discrete logarithmic representations for the public key PKC, which means that the attacker can generate forged pseudonyms. Without the knowledge of the exact discrete logarithmic representation for the public key PKC of a not-cracked portable data carrier, an attacker can, however, not generate the pseudonym of such a data carrier.

To prevent this possibility as well, according to preferred embodiments of the invention the following approach while employing a whitelist or positive list can be applied. The terminal 10 comprises a positive list with the pseudonyms K of all authentic portable data carriers with regard to an RI base element J. If the pseudonym of a data carrier appears in the whitelist, then the portable data carrier 20 has hitherto not been revoked, so that communication according to the invention is possible with this portable data carrier 20. Otherwise, i.e. if the pseudonym of a portable data carrier appears in the whitelist, the communication with this portable data carrier should be aborted.

Hereinafter a proof of security of the method of FIG. 2 according to the invention is briefly sketched. The proof of security is based on the two following assumptions or presumptions as well as on the "Binding Theorem".

1. Presumption: If Q1, Q2 and Y are given, then it is difficult to compute s and t.

2. Presumption: If Q1, Q2 and Y as well as a random number r are given, then in order to compute $Y*r$ from $Q1*r$ and $Q2*r$, however without the knowledge of r, a DLREP of Y must be known with regard to the bases Q1 and Q2, i.e. $Y=Q1*s+Q2*t$.

"Binding Theorem": After carrying out the method according to the invention of FIG. 2, the terminal 10 can be sure that a) the portable data carrier 20 knows a discrete logarithmic representation of $PKC=G1*s+G2*t$ and b) that it holds $K=J*s$.

Assuming that the portable data carrier 20 and the terminal 10 have computed the same common secret Z, then the DLREP DH problem implies, when this is applied to $Y=PKC*r+K$, $Q1=G1*r+J$ and $Q2=G2*r$, that the portable data carrier 20 must know a discrete logarithmic representation (DLREP) of $PKC*r+K$ to the bases $G1*r+J$ and $G2*r$, i.e.

$$PKC*r+K=(G1*r+J)*s+G2*r*t \qquad (1)$$

Because r has been chosen randomly by the terminal 10, the portable data carrier 20 must likewise know a representation with the same K and the other bases $Q1'=G1*r'+J$ and $Q2'=G2*r'$, i.e.

$$PKC*r'+K=(G1*r'+J)*s'+G2*r'*t' \qquad (2)$$

First it is shown, that, if $s \neq s'$ or $t \neq t'$ the portable data carrier 20, the issuer of the portable data carrier 20 and the terminal 10 together can solve a difficult discrete logarithmic problem. J shall be chosen so that the discrete logarithm of J to the base G1 is completely unknown. If one subtracts equation (2) from equation (1), one obtains:

$$PKC*(r-r')=G1*(r*s-r'*s')+G2*(r*t-r'*t')+J*(s-s') \qquad (3)$$

The issuer of the portable data carrier 20 knows a discrete logarithmic representation of PKC, e.g. $PKC=G1*s''+G2*t''$. The issuer further knows the discrete logarithm of G2 to the base G1, e.g. $G2=G1*u$. Hereby equation (3) can be written as follows:

$$J=G1*((r*s-r'*s')*(s''*(r-r'))^{\wedge}(-1)+u*(r*t-r'*t')*(t''*(r-r'))^{\wedge}(-1)) \qquad (4)$$

This means, however, that the discrete logarithm of J to the base G1 can be computed, which contradicts the assumptions made hereinabove. It follows that there must hold $s=s'$ and $t=t'$. If one subtracts equation (2) from equation (1) under this stipulation, one obtains:

$$PKC*(r-r')=G1*(r-r')*s+G2*(r-r')*t \qquad (5)$$

If one divides this equation by (r−r'), one recognizes that the values s and t can likewise be employed as a valid discrete logarithmic representation of PKC to the bases G1 and G2. If one replaces this representation of PKC in equation (1), one immediately obtains that there holds $K=J*s$.

The skilled person will recognize that although hereinabove preferred embodiments of the invention have been described within the scope of variants of a DH key agreement by means of elliptical curves, the invention can likewise be used within the scope of a general DH method which is not based on elliptical curves.

The invention claimed is:

1. A method for pseudonymously establishing a key Z between a data carrier and a terminal device comprising:
   obtaining, on the terminal device, a base element J and two group elements G1 and G2, wherein a discrete logarithm of G2 to a base G1 is u;

obtaining, on the portable data carrier, a public key PKC and secrets s and t, wherein a public key PKC is a discrete-logarithm representation formed from the secrets s and t and the two group elements G1 and G2;

receiving, by the portable data carrier, the base element J and a first derived base element H1 and a second derived base element H2 from the terminal device, wherein the first derived base element H1 is derived from the base element J and the group element G1 using a first random number r1 and a second random number r2, and the second derived base element H2 is derived from the group element G2 using the first random number r1 and the second random number r2;

computing, by the portable data carrier, a pseudonym K using the base element J transferred from the terminal device and the secret s;

sending, by the portable data carrier, the public key PKC and the pseudonym K to the terminal device; and computing, by the portable data carrier, a common secret Z using the derived base elements H1 and H2 and the secrets s and t, wherein the common secret Z is employed as the key Z between the portable data carrier and the terminal device, the key Z facilitating a pseudonymous authentication between the portable data carrier and the terminal device having increased security.

2. The method according to claim 1, wherein the common secret Z is computed by computing Z=H1*s+H2*t.

3. The method according to claim 1, wherein the first derived base element H1 is derived by computing H1= (G1*r1+J)*r2 , and the second derived base element H2 is derived by computing H2=G2*r1*r2.

4. The method according to claim 1, wherein the pseudonym K is computed by computing K=J*s.

5. The method according to claim 4, wherein an obfuscated pseudonym K' is computed by the portable data carrier and sent to the terminal device.

6. The method according to claim 5, wherein for the obfuscated pseudonym K' it holds that K' =K*r3, wherein r3 is a random number.

7. A method for pseudonymously establishing a key Z between a portable data carrier and a terminal device comprising:
obtaining, on the terminal device, a base element J and two group elements G1 and G2, wherein a discrete logarithm of G2 to a base G1 is u;
obtaining, on the portable data carrier, a public key PKC and secrets s and t, wherein a public key PKC is a discrete-logarithm representation formed from the secrets s and t and the two group elements G1 and G2;
generating, by the terminal device, a first random number r1 and a second random number r2;
deriving, by the terminal device, a first derived base element H1 and a second derived base element H2, wherein the first derived base element H1 is derived from the base element J and the group element G1 using the first random number r1 and the second random number r2, and the second derived base element H2 is derived from the group element G2 using the random number r1 and the second random number r2;
sending, by the terminal device, the base element J, the first derived base element H1 and the second derived base element H2 to the portable data carrier;
receiving, by the terminal device, the public key PKC and a pseudonym K of the portable data carrier, wherein the pseudonym K is formed from the base element J and the secret s; and computing, by the terminal device, a common secret Z using the public key PKC, the first random number r1, the pseudonym K and the second random number r2, wherein the common secret Z is employed as the key Z between the portable data carrier and the terminal device, the key Z facilitating a pseudonymous authentication between the portable data carrier and the terminal device having increased security.

8. The method according to claim 7, wherein the common secret Z is computed by computing Z=(PKC*r1+K)*r2.

9. The method according to claim 7, wherein a positive list of the pseudonyms of all authentic portable data carriers with regard to the base element J is deposited on the terminal device.

10. The method according to claim 7, wherein the first derived base element H1 is derived by computing H1= (G1*r1+J)*r2 , and the second derived base element H2 is derived by computing H2=G2*r1*r2.

11. The method according to claim 7, wherein the pseudonym K is computed by computing K=J*s.

12. The method according to claim 11, wherein an obfuscated pseudonym K' is computed by the portable data carrier and sent to the terminal device.

13. The method according to claim 12, wherein for the obfuscated pseudonym K' it holds that K' =K*r3, wherein r3 is a random number.

14. A portable data carrier configured for pseudonymously establishing a key Z between the portable data carrier and a terminal device comprising:
a central processing unit; and
a memory coupled to the central processing unit, the memory including program instructions stored thereon that, when executed by the central processing unit, cause the portable data carrier to:
obtain, on the terminal device, a base element J and two group elements G1 and G2 , wherein a discrete logarithm of G2 to a base G1 is u;
obtain, on the portable data carrier, a public key PKC and secrets s and t, wherein a public key PKC is a discrete-logarithm representation formed from the secrets s and t and the two group elements G1 and G2;
receive the base element J and a first derived base element H1 and a second derived base element H2 from the terminal device, wherein the first derived base element H1 is derived from the base element J and the group element G1 using a first random number r1 and a second random number r2 , and the second derived base element H2 is derived from the group element G2 using the first random number r1 and the second random number r2;
compute a pseudonym K using the base element J transferred from the terminal device and the secret s;
send the public key PKC and the pseudonym K to the terminal device; and
compute a common secret Z using the derived base elements H1 and H2 and the secrets s and t, wherein the common secret Z is employed as the key Z between the portable data carrier and the terminal device, the key Z facilitating a pseudonymous authentication between the portable data carrier and the terminal device having increased security.

15. The portable data carrier according to claim 14, wherein the portable data carrier is a security document.

* * * * *